United States Patent
King

(10) Patent No.: US 10,906,451 B2
(45) Date of Patent: Feb. 2, 2021

(54) AIMING APPARATUS FOR AUTOMOTIVE HEADLAMP

(71) Applicant: Valeo North America, Inc., Troy, MI (US)

(72) Inventor: Robert King, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/433,589

(22) Filed: Jun. 6, 2019

(65) Prior Publication Data

US 2020/0384911 A1 Dec. 10, 2020

(51) Int. Cl.
*B60Q 1/068* (2006.01)
*B60Q 1/072* (2006.01)

(52) U.S. Cl.
CPC ........... *B60Q 1/0683* (2013.01); *B60Q 1/072* (2013.01); *B60Q 2200/32* (2013.01); *B60Q 2200/34* (2013.01)

(58) Field of Classification Search
CPC .. B60Q 1/0683; B60Q 1/072; B60Q 2200/32; B60Q 2200/34
See application file for complete search history.

(56) References Cited

U.S. PATENT DOCUMENTS

| | | | | |
|---|---|---|---|---|
| 5,197,794 A * | 3/1993 | Scott | ................... | B60Q 1/0686 33/370 |
| 5,260,857 A * | 11/1993 | Lukkarinen | ........... | F21S 41/675 362/528 |
| 5,270,907 A * | 12/1993 | Lisak | ....................... | B60Q 1/06 362/421 |
| 5,833,346 A * | 11/1998 | Denley | ................ | B60Q 1/0686 362/507 |
| 6,146,005 A * | 11/2000 | Sullivan | ............... | B60Q 1/0683 362/306 |
| 6,220,735 B1 * | 4/2001 | Matubara | ............. | B60Q 1/0683 362/269 |
| 6,257,747 B1 * | 7/2001 | Burton | ................ | B60Q 1/0683 362/273 |
| 6,338,567 B1 * | 1/2002 | Denley | ................ | B60Q 1/0683 362/284 |
| 10,513,215 B1 * | 12/2019 | Kuo | ........................ | F21S 41/30 |
| 2010/0296307 A1 * | 11/2010 | Nakabayashi | ......... | B60Q 1/072 362/523 |
| 2016/0257230 A1 * | 9/2016 | Tsuji | ........................ | B60N 2/64 |

* cited by examiner

*Primary Examiner* — Leah Simone Macchiarolo
(74) *Attorney, Agent, or Firm* — Valeo North America, Inc.

(57) ABSTRACT

The present invention relates to a headlamp's aiming apparatus, in which the headlamp's optical axis is adjustable with respect to a vehicle body, the aiming apparatus that includes a stationary member secured to a portion of the headlamp; a tiltable member attached to the stationary member via one or more adjustment shafts; and a fixed pivot shaft to allow pivotal connection with the headlamp's tiltable member. Adjustment shafts include a ball portion at a forward end portion, a drive shaft portion at a rear end portion and a flexible portion between the ball and drive shaft portions. The pivot shaft in conjunction with the adjustment shafts enable the tiltable member to tilt about a horizontal axis and a vertical axis of the headlamp to adjust the headlamp's optical axis, and the flexible portion is adapted to deflect in multiple directions to enhance accessible degrees of freedom during the headlamp's optical axis adjustments.

14 Claims, 4 Drawing Sheets

AIMING APPARATUS FOR AUTOMOTIVE HEADLAMP

FIELD OF THE INVENTION

The present invention relates to an aiming apparatus for the automotive headlamp for adjusting an optical axis of the headlamp, and more particularly, to flexible adjustment shafts of the aiming apparatus.

BACKGROUND

Efforts to improve the functionality of aiming mechanism of vehicular headlamps are an on-going endeavor among Original Equipment Manufacturers (OEM) and the numerous component/system suppliers. Of particular interest is the desire to minimize the stress on other components of the headlamp during the aiming. The present invention is directed one such innovation solution to provide an aiming apparatus that can minimize the stress on other components of the vehicular headlamp when the aiming operation is performed.

Known aiming apparatus for a headlamp includes a tiltable member assembled to a stationary member of the headlamp by means of three connection points. The tiltable member may be movable relative to the stationary member of the headlamp to correct the orientation of the illuminated beam in particular in azimuth or horizontally as well as vertically. The three connection points include, a fixed connection point around which the a tiltable member can be rotated; a first connection point by which the tiltable member is vertically movable relative to the stationary member; and a second connection point by which the tiltable member is horizontally movable relative to the stationary member. These three connection points form a triangle; two vertices are movable in translation approximately a perpendicular to a plane formed by the triangle to adjust the illuminated beam horizontally and vertically. The first and second connection points include adjusting screws screwed to nuts supported by the stationary member. The adjusting screws are adapted to move in forward and backward in the axial direction in order to tilt the tiltable member horizontally and/or vertically. This movement of the adjusting screws may generate excess stress at the connection points or on other components of and may damage the headlamp. The stress thus generated may also limit aimiablity of the headlamp. The invention herein overcomes one or more of the problems of the known aiming apparatus.

SUMMARY OF THE INVENTION

The present invention is directed to a unique solution to one or more of the problems discussed above. It is believed that that the present invention provides an aiming apparatus that can minimize the stress on other component of the headlamp when the aiming operation of the headlamp is performed. In particular, the present invention provides the aiming apparatus having an adjustment shafts comprising a flexible portion, which allows moving at least a portion of the adjustment shafts in one or more directions when the aiming operation of the headlamp is performed.

Accordingly, pursuant to a first aspect of the present invention, there is contemplated an aiming apparatus for a headlamp, in which an optical axis of said headlamp is adjustable with respect to a vehicle body, the aiming apparatus comprising: a stationary member secured to a portion of the headlamp; a tiltable member is attached to the stationary member via one or more adjustment shafts and a fixed pivot shaft to allow pivotal connection with a tiltable member of the headlamp; wherein the one or more adjustment shafts comprises a ball portion at a forward end portion, a drive shaft portion at a rear end portion, and a flexible portion disposed between the ball portion and the drive shaft portion; wherein the pivot shaft in conjunction with the one or more adjustment shafts enable the tiltable member to tilt about at least one of a horizontal axis and a vertical axis of the headlamp to adjust the optical axis of the headlamp, and wherein the flexible portion is adapted to deflect in one or more directions during the adjustment of the optical axis.

The invention may be further characterized by one or any combination of the features described herein, such as the flexible portion has a zig-zag shaped profile; the flexible portion has a spiral shaped profile; the zigzag shaped profile of the flexible portion allow the adjustment shafts to move vertically upwards and downwards with respect to a longitudinal axis of the adjustment shafts during the aiming operation; the spiral shaped profile of the flexible portion allow the adjustment shafts to move vertically upwards and downwards with respect to a longitudinal axis of the adjustment shafts, and left and right along the axis parallel to the front of the vehicle, during the aiming operation; number of teeth of the flexible portion is in a range between 3 to 6; the deflection has a deflection value between 0.1 degrees and 15 degrees; a length of the flexible portion is smaller than a length of the drive shaft portion; the tiltable member is a lighting module having a light source; the stationary member is a headlamp support frame; the adjustment shafts and the pivot shaft are coupled to the headlamp by means of a ball-socket type connection; the balls of the adjustment shaft and the pivot shaft are received in sockets fixably connected with the tiltable member; rear ends of the adjustment shafts are coupled to one or more actuators; the tiltable member tilts about at least one of the horizontal axis and the vertical axis in response to an operation of the one or more actuators; and rear ends of the adjustment shafts are coupled to a gear means for the movement of the adjustment shafts in response to rotation of the gear means.

It should be appreciated that the above referenced aspects and examples are non-limiting, as others exist within the present invention, as shown and described herein.

DETAILED DESCRIPTION OF THE PREFERRED EMBODIMENTS

The present invention relates to an aiming apparatus for the automotive headlamp, in which an optical axis of the headlamp is adjustable with respect to a vehicle body. The present invention provides an aiming apparatus that can minimize the stress on other components of the headlamp when the aiming operation of the headlamp is performed. In particular, the present invention provides the aiming apparatus having one or more flexible adjustment shafts comprising a flexible portion, which allows moving at least a portion of the adjustment shafts in one or more directions when the aiming operation of the headlamp is performed. Hereinafter, the term 'aiming operation' is understood as adjustment of the optical axis of the headlamp with respect to the vehicle body.

Figure 1:
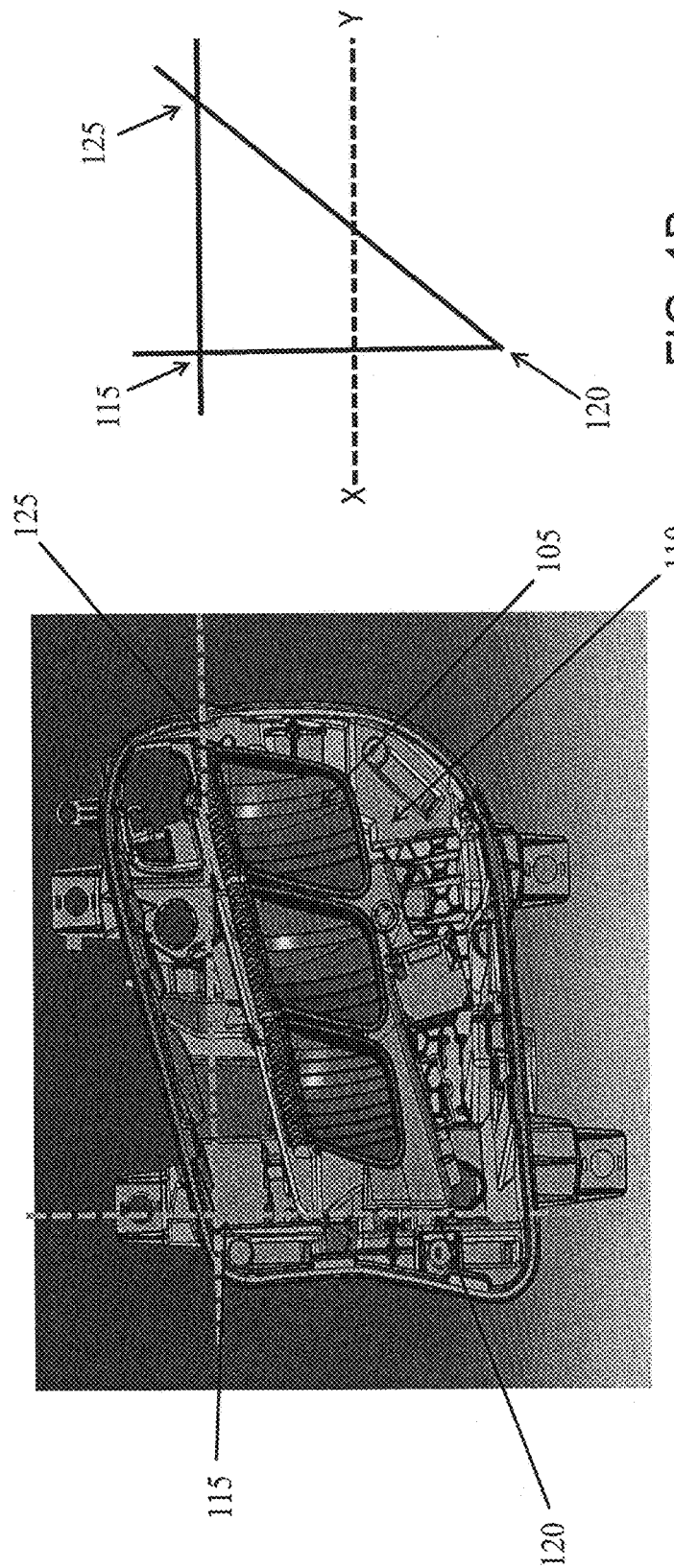
FIG. 1A shows an optical module of an automotive headlamp assembled to the housing of the headlamp according to the present invention.
FIG. 1B shows an explanatory view of the operation of the optical module during the aiming operation of the headlamp, according to the present invention.
Figure 2:
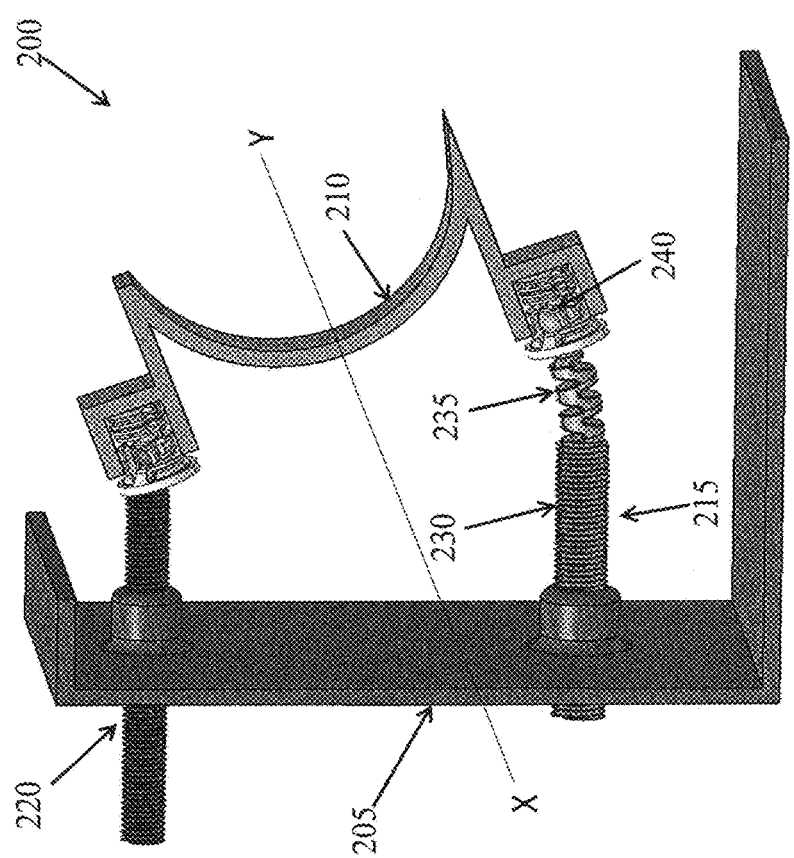
FIG. 2 is a vertical cross sectional view illustrating an aiming apparatus for an automobile headlamp constructed according to the present invention.
Figure 3:
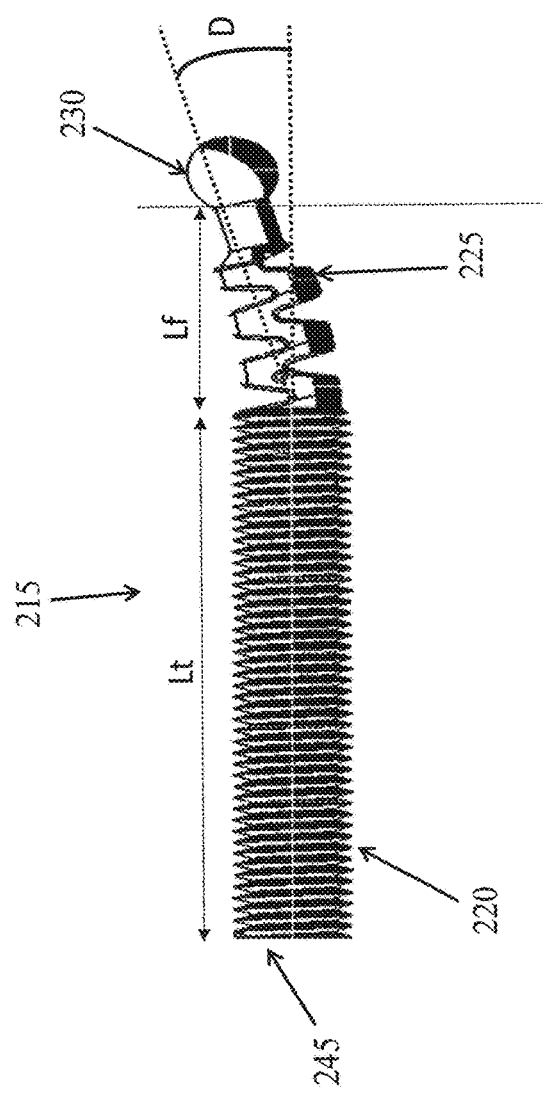
FIG. 3 shows a flexible portion flexing upwards during the aiming operation, in accordance with the present invention.
Figure 4:
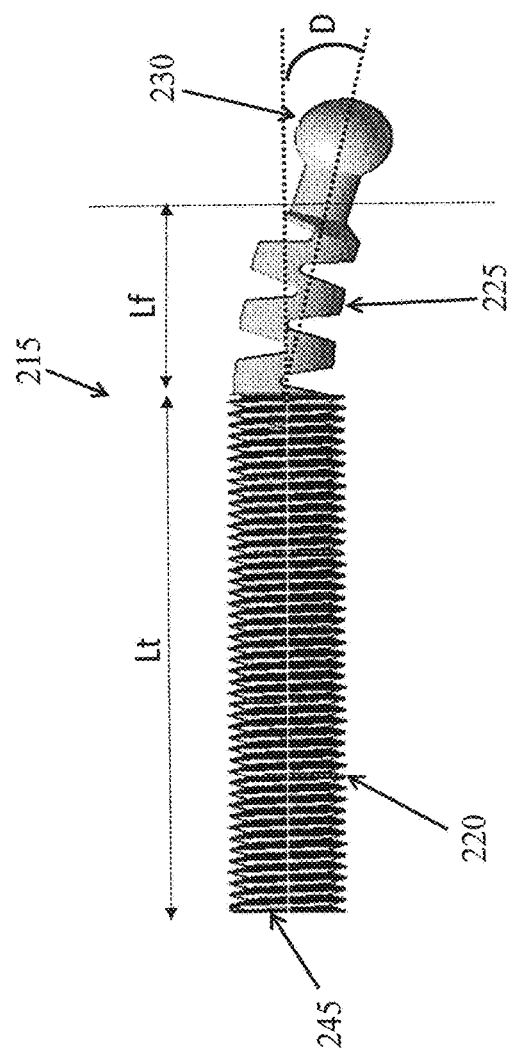
FIG. 4 shows a flexible portion flexing downwards during the aiming operation, in accordance with the present invention.

The present invention is illustrated in a number of exemplary embodiments, as shown in the FIG. 1A, FIG. 1B, FIG. 2, FIG. 3, and the FIG. 4. Of these, FIG. 1A shows an optical module of an automotive headlamp assembled to the housing of the headlamp according to the present invention. FIG. 1B shows an explanatory view of the operation of the optical module during the aiming operation, according to the present invention. FIG. 2 shows a vertical cross sectional view illustrating an aiming apparatus for an automobile headlamp constructed according to the present invention. FIG. 3 shows a flexible portion flexing upwards during the aiming operation, in accordance with the present invention. FIG. 4 shows a flexible portion flexing downwards during the aiming operation, in accordance with the present invention.

As shown in the FIG. 1A, the headlamp for the automotive vehicle comprises a tiltable member, for example, an optical module 105, which is connected to a stationary member, for example, housing or a bracket 110 of the headlamp. The optical module 105 comprises reflectors (s) and other components such as monochip or multichip to provide different illumination and/or signaling functions in the automotive vehicle. The optical module 105 is connected to the housing or the bracket 110 of the headlamp by at least one connection point. In an embodiment, the optical module 105 is assembled to the bracket 110 of the headlamp by means of three connection points 115, 120, 125. The optical module 105 is movable relative to the housing 110 of the headlamp to correct an orientation of the illuminated beam, in particular in azimuth or horizontally as well as vertically. The three connection points 115, 120, 125 are formed by one or more adjustment shafts and a fixed pivot shaft (shown in the FIG. 2). The three connection points 115, 120, 125, namely a fixed connection point around which the optical module can be rotated; a first connection point by which the optical module can move vertically with respect to the bracket; and a second connection point by which the optical module 105 can be moved horizontally relative to the bracket 105. These three connection points form a triangle, as shown in the FIG. 1B; two vertices are movable in translation approximately one perpendicular to a plane formed by the triangle to adjust the illuminated beam horizontally and vertically. The optical axis XY of the headlamp is generally perpendicular to the plane formed by the three connection points 115, 120, 125.

FIG. 2 shows a vertical cross sectional view illustrating an aiming apparatus for an automobile headlamp constructed according to the present invention. In the FIG. 2, reference numeral 205 denotes a lamp housing or a headlamp support frame or a bracket, which is a stationary member. The stationary member 205 is secured to a portion of the headlamp. The aiming apparatus 200 include the tiltable member 210 attached to the stationary member 205 via one or more adjustment shafts 215, preferably two adjustment shafts, and a fixed pivot shaft 220 to allow pivotal connection with the tiltable member 210 of the headlamp.

As previously mentioned, the tiltable member 210 may be the optical module of the headlamp, and the tiltable member 210 defines the illumination angle of the headlamp (i.e., optical axis of the lamp). The tiltable member 210 is movable relative to the stationary member 205 of the headlamp to correct the orientation of the illuminated beam in particular in azimuth or horizontally as well as vertically. For this purpose, the adjustment shafts 215 and the pivot shaft 220 are provided. The pivot shaft 220 in conjunction with the adjustment shafts 215 enable the tiltable member 210 to tilt about at least one of a horizontal axis and a vertical axis of the headlamp to adjust the optical axis XY of the headlamp.

For the sake of brevity, a single adjustment shaft 215 and a fixed pivot shaft 220 are shown in the FIG. 1. However, it is understood to a person skilled in the art that at least two adjustment shafts and a single fixed pivot shaft are required to to correct the orientation of the illuminated beam in particular in azimuth or horizontally as well as vertically.

In an embodiment, the adjustment shafts 215 and the pivot shaft 220 are coupled to the headlamp by means of a ball-socket type connection. As can be seen from the FIG. 2, the balls 240 of the adjustment shaft 215 and the pivot shaft 220 are received in sockets fixably connected with the tiltable member 210. Although the ball-socket type connection is shown in the FIG. 2, it is understood to a person skilled in the art that any suitable connection mechanism can be adapted to couple the the adjustment shafts 215 and the pivot shaft 220 to the headlamp.

As shown in the FIG. 2, each adjustment shaft 215 comprises a ball portion 240 at a forward end portion, a drive shaft portion 230 at a rear end portion, and a flexible portion 235 disposed between the ball portion 240 and the drive shaft portion 230. The drive shaft portion 230 is substantially cylindrical in shape and can be solid or be threaded. In an embodiment, the length (Lf) of the flexible portion 235 is lesser than the length (Lt) of the drive shaft portion 230. In another embodiment, the length (Lf) of the flexible portion 235 is substantially same as the length (Lt) of the drive shaft portion 230.

In an embodiment of the present invention, the flexible portion 235 has a zigzag shaped profile. In another embodiment of the present invention, the flexible portion 235 has a spiral shaped profile. Yet, in another embodiment of the present invention, the flexible portion 235 has a saw tooth shaped profile. Still, in another embodiment of the present invention, the flexible portion 235 has a Z shaped profile. Although few profiles of the flexible portion 235 are discussed above, it is understood to a person skilled in that art that the flexible portion 235 may be of any shape that can allow deflection of the flexible portion 235 in one or more directions during the aiming operation.

In an embodiment, the flexible portion 235 include plurality of teeths, which are required to perform the desired aiming operation. For example, the number of teeths of the flexible portion in the range between 3 to 6. Further, teeth (or threads) in the drive shaft portion 230 are closely spaced relative to one another, and in the flexible portion 235 the teeth are widely spaced relative to one another. This can be clearly seen from the FIG. 3 and the FIG. 4. Each of the teeth in the flexible portion 235 and drive shaft portion 230 has same height.

In an embodiment of the present invention, rear end 245 of the drive shaft portion 230 are coupled to one or more actuators (not shown in the Figures). In another embodiment, rear end 245 of the adjustment shafts are coupled to a gear means (not shown in the Figures) for the movement in response to rotation of the gear means.

The flexible portion 235 is adapted to deflect in one or more directions during the adjustment of the optical axis, i.e., during the aiming operation of the headlamp. During the aiming operation, the tiltable member 210 tilts about at least one of the horizontal axis and the vertical axis in response to an operation of the one or more actuators or in response to the rotation of the gear means.

In an embodiment, the zigzag shaped profile of the flexible portion 235 allow the adjustment shafts 215 to move vertically upwards and downwards with respect to a longitudinal axis of the adjustment shafts 215 during the aiming operation.

In another embodiment, the spiral shaped profile of the flexible portion 235 allow the adjustment shafts 215 to move vertically upwards and downwards with respect to a longitudinal axis of the adjustment shafts 215, and left and right along the axis parallel to the front of the vehicle, during the aiming operation.

In an embodiment, both the flexible portion 235 and the drive shaft portion 230 are made of same material. In another embodiment, the flexible portion 235 and the drive shaft portion 230 are made of different materials. The flexible portion 235 may be made from a rigid and slightly flexible plastic. The materials used to make the flexible portion 235 may be selected from a group consisting of Teflon, nylon, ABS (acrylonitrile butadiene styrene) resin, PC (polycarbonate), Bakelite, and other materials having similar properties.

As mentioned previously, during the aiming operation, the flexible portion 235 is adapted to deflect in one or more directions to absorb misalignment and relieve stress on other components of the headlamp. In an embodiment, the deflection (D) of the flexible portion 235 has a deflection value between 0.1 degrees and 15 degrees. As can be seen from the FIG. 3, in an embodiment, during the aiming operation, the flexible portion 235 is deflected upwards such that the flexible portion 235 absorbs misalignment if any and relieve stress on other components of the headlamp. Further, as can be seen from the FIG. 4, in another embodiment, the flexible portion 235 is deflected downwards during the aiming operation in order to relieve stress on other components of the headlamp. Thus, the adjustment shafts 215 of the present invention are capable of relieving stress on other components during the aiming operation, thus preventing the damage of the headlamps.

The present invention is not limited in its implementation to the above described embodiments. Rather, a number of variants which make use of the described solution even for basically different configurations. More particularly, the present invention is not limited to the embodiments of the lighting unit as a frontal head of the motor vehicle. The present invention is also directed to lighting units that serve as a tail light of the motor vehicle.

Although the present disclosure is provided with reference to figures, all of the embodiments shown in figures are intended to explain the preferred embodiments of the present invention by ways of examples, instead of being intended to limit the present invention.

Apparently, it would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially" of to describe a combination shall include the elements, ingredients, components or steps identified, and such other elements ingredients, components or steps that do not materially affect the basic and novel characteristics of the combination.

The invention claimed is:

1. An aiming apparatus of an automotive headlamp, in which an optical axis of said headlamp is adjustable with respect to a vehicle body, the aiming apparatus comprising:
    a stationary member secured to a portion of said headlamp;
    a tiltable member of the headlamp attached to the stationary member via one or more adjustment shafts and a fixed pivot shaft to allow pivotal connection with the tiltable member;
    wherein the one or more adjustment shafts comprises a ball portion at a forward end portion, a drive shaft portion at a rear end portion, and a flexible portion disposed between the ball portion and the drive shaft portion;
    wherein the pivot shaft in conjunction with each respective adjustment shaft enables the tiltable member to tilt about at least one of a horizontal axis and a vertical axis of the headlamp to adjust the optical axis of said headlamp; and
    wherein the flexible portion directly abuts the drive shaft portion and where the flexible portion conforms to a form that is contiguously spiral or zigzag shaped only along the flexible portion's length of each adjustment shaft; and
    wherein the flexible portion is adapted to deflect in one or more directions during adjustments of the optical axis.

2. The aiming apparatus of claim 1, wherein the zigzag shaped profile of the flexible portion allow the adjustment shafts to move vertically upwards and downwards with respect to a longitudinal axis of the adjustment shafts during the aiming operation.

3. The aiming apparatus of claim 1, wherein the spiral shaped profile of the flexible portion allow the adjustment shafts to move vertically upwards and downwards with respect to a longitudinal axis of the adjustment shafts, and left and right along the axis parallel to the front of the vehicle, during the aiming operation.

4. The aiming apparatus of claim 1, wherein a number of teeth of the flexible portion is in a range between 3 to 6.

5. The aiming apparatus of claim 1, wherein the deflection of the flexible portion has a deflection value between 0.1 degrees and 15 degrees.

6. The aiming apparatus of claim 1, wherein a length of the flexible portion is smaller than a length of the drive shaft portion.

7. The aiming apparatus of claim 1, wherein the tiltable member is an optical module of the headlamp.

8. The aiming apparatus of claim 1, wherein the stationary member is a headlamp support frame or a bracket.

9. The aiming apparatus of claim 1, wherein the adjustment shafts and the pivot shaft are coupled to the headlamp by means of a ball-socket type connection.

10. The aiming apparatus of claim 1, wherein rear ends of the adjustment shafts are coupled to one or more actuators.

11. The aiming apparatus of claim 10, wherein the tiltable member tilts about at least one of the horizontal axis and the vertical axis in response to an operation of the one or more actuators.

12. The aiming apparatus of claim 1, wherein rear ends of the adjustment shafts are coupled to a gear means for the movement of the adjustment shafts in response to rotation of the gear means.

13. An aiming apparatus of an automotive headlamp, in which an optical axis of said headlamp is adjustable with respect to a vehicle body, the aiming apparatus comprising:
a stationary member secured to a portion of the headlamp;
  a tiltable member attached to the stationary member via one or more adjustment shafts and a fixed pivot shaft to allow pivotal connection with the tiltable member of the headlamp;
  wherein the one or more adjustment shafts comprise a ball portion at a forward end portion, a drive shaft portion at a rear end portion, and a flexible portion disposed between the ball portion and the drive shaft portion;
  wherein the pivot shaft in conjunction with the one or more adjustment shafts enable the tiltable member to tilt about at least one of a horizontal axis and a vertical axis of the headlamp to adjust the optical axis of the headlamp;
  wherein the flexible portion is contiguous with the drive shaft portion and where the flexible portion conforms to a form with spiral or zigzag shaped contiguous elements that span only along the flexible portion's length of each adjustment shaft;
  wherein the flexible portion is adapted to deflect in one or more directions during the adjustment of the optical axis; and
  wherein the deflection of the flexible portion has a deflection value between 0.1 degrees and 15 degrees.

14. An aiming apparatus of an automotive headlamp, in which an optical axis of said headlamp is adjustable with respect to a vehicle body, the aiming apparatus comprising:
a stationary member secured to a portion of the headlamp;
  a tiltable member attached to the stationary member via one or more adjustment shafts and a fixed pivot shaft to allow pivotal connection with the tiltable member of the headlamp;
  wherein the one or more adjustment shafts comprises a ball portion at a forward end portion, a drive shaft portion at a rear end portion, and a flexible portion disposed between the ball portion and the drive shaft portion;
  wherein the pivot shaft in conjunction with the one or more adjustment shafts enable the tiltable member to tilt about at least one of a horizontal axis and a vertical axis of the headlamp to adjust the optical axis of the headlamp; and
  wherein the flexible portion is contiguous with the drive shaft portion and where the flexible portion conforms to a form with spiral or zigzag shaped contiguous elements that span only along the flexible portion's length of each adjustment shaft,
  wherein the flexible portion is adapted to deflect in one or more directions during the adjustment of the optical axis,
wherein the deflection of the flexible portion has a deflection value between 0.1 degrees and 15 degrees;
  wherein the flexible portion allows said adjustment shafts to move vertically upwards and downwards with respect to a longitudinal axis of each respective adjustment shafts during aiming operations;
  wherein the form of the flexible portion allows respective adjustment shafts to move vertically upwards and downwards with respect to a longitudinal axis of each respective adjustment shafts, and allows left and right movement along an axis parallel to a front of the vehicle during aiming operations.

* * * * *